United States Patent [19]

Schiel

[11] Patent Number: 4,829,842
[45] Date of Patent: May 16, 1989

[54] SPUR GEARING FOR THE DRIVING OF A ROLLER SHELL

[75] Inventor: Christian Schiel, Heidenheim, Fed. Rep. of Germany

[73] Assignee: J.M. Voith GmbH, Fed. Rep. of Germany

[21] Appl. No.: 153,984

[22] Filed: Feb. 9, 1988

[30] Foreign Application Priority Data

Feb. 12, 1987 [DE] Fed. Rep. of Germany ....... 3704374

[51] Int. Cl.$^4$ .......................... F16H 1/06; B21B 13/02
[52] U.S. Cl. ..................................... 74/421 R; 29/115; 29/116.1; 29/116.2; 74/432; 72/237; 100/162 B
[58] Field of Search ............... 74/421 R, 432; 29/115, 29/116 R, 116 AD; 72/237, 249; 100/162

[56] References Cited

U.S. PATENT DOCUMENTS

| | | | |
|---|---|---|---|
| 3,766,620 | 10/1973 | Roerig | 29/115 |
| 3,889,334 | 6/1975 | Justus et al. | 29/115 |
| 4,414,890 | 11/1983 | Schiel et al. | 29/116 AD X |
| 4,676,117 | 6/1987 | Schiel | 74/421 R |

*Primary Examiner*—Allan D. Herrmann
*Attorney, Agent, or Firm*—Ostrolenk, Faber, Gerb & Soffen

[57] ABSTRACT

Spur gearing including an outer gear rim firmly attached to the roller to be driven. A first self-aligning bearing disposed within the outer gear rim mounts the gear rim to a firm support. A pinion outside of the outer gear rim meshes with the outer gear rim. A journal in the pinion connects it to a support bracket. A second self-aligning bearing joins the pinion to the journal. A pinion driving coupling shaft is coupled to the pinion for driving the pinion to rotate. The pinion can incline with respect to the coupling shaft. To limit the angle of tilt of the pinion, in one embodiment, there is a third self-aligning bearing within the pinion to one axial side of the second bearing and a radial gap between an extension of the journal for the second bearing and the third bearing, for allowing and limiting tilting of the pinion axis, and the elements are so sized that the tilt angle of the pinion is limited to about 1° and preferably to less than 0.6°. In the second embodiment, instead of the third self-aligning bearing, the tilt angle limiting device includes a first pair of collar disks respectively on one axial side of each of the outer gear rim and the pinion gear, and a second pair of collar disks on the other axial side of those gears. The collar disks are so dimensioned that there is normally a radial gap between the disks of both pairs. Beyond a predetermined tilt angle of about 1° and preferably of less than 0.6°, depending upon the direction of tilt of the pinion, a pair of the collar disks engage to limit the tilting of the pinion.

17 Claims, 2 Drawing Sheets

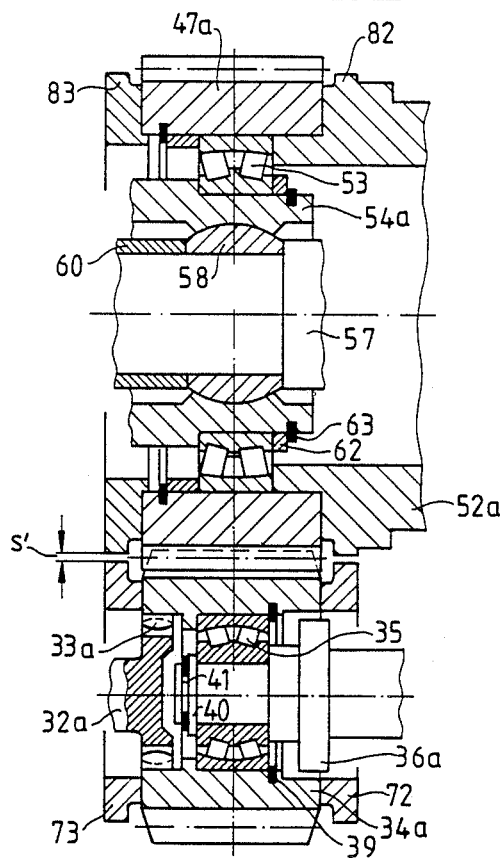

ns of the roller shell, around the center point of the outer gear rim, the inclination of the outer gear rim relative to the gear housing support bracket.

SPUR GEARING FOR THE DRIVING OF A ROLLER SHELL

BACKGROUND OF THE INVENTION

The present invention relates to spur gearing for a drive, particularly the drive of a roller shell.

Spur gearing of this type is known from Federal Republic of Germany Patent No. 33 30 204 which corresponds to U.S. Pat. No. 4,676,117. It is particularly suitable for driving a hollow roller shell which rotates around a stationary inner part, like a beam, from which it is radially spaced. Rollers of this type comprise, for example, sag adjustment rollers or suction rollers which are used in the paper-making industry, for instance in water-removal presses, calenders, or the like. A preferred field of use of the invention is on equidistantly mounted sag adjustment rollers. In these, the bearings of the roller shell, the bearings of the mating roller and the spherical supports of the yoke((a flexure beam or girder which extends through the roller shell) are arranged with at least approximately the same bearing spacing, as described in U.S. Pat. No. 4,414,890 and its reissue, Re. No. 32,856.

FIG. 3 of U.S. Pat. No. 4,414,890 (but not its reissue) also shows spur gearing for the driving of the roller shell. In that case, as in the present invention, the outer gear rim is firmly attached to one end of the roller shell. Upon operation of the roller under load, if the roller shell sags, then the outer gear rim inclines slightly, together with the axial end region of the roller shell, relative to the non-inclinable gear housing. That housing at the same time serves as a support bracket for the entire roller. Upon standstill or roller operation without load, the roller can be lifted by the shifting of the supporting bracket away from the mating roller. In that case, under certain circumstances, the entire roller may assume a slightly oblique orientation. Also, in this case the outer gear rim inclines slightly relative to the support bracket or gear housing. In all cases, the outer gear rim inclines such that it tilts slightly around its center point. For supporting the roller shell, there is within the outer gear rim a first self-aligning bearing having a center point also lying at least approximately in the central plane of the outer gear rim which is perpendicular to the axis of rotation of the roller. The pinion which meshes with the outer gear rim is mounted in a similar manner. In this way, the pinion can follow the inclining of the outer gear rim.

However, this measure alone does not assure that the axes of the two gear wheels will remain at least approximately parallel to each other upon transfer of torque by the gearing. Yet, such a parallel orientation is necessary in order that the meshing gear wheels can always transfer the full torque Thus, in the arrangement of FIG. 3 of U.S. Pat. No. 4,414,890, during the transmission of torque, there is a danger that the pinion will tilt out of its normal position in which the axes and tooth flanks of the two gear wheels are parallel to each other. When the gears become tilted out of position, then the teeth still contact each other, but only in a narrow region in the center of the gears. This presents the danger that the gears will be overloaded.

Measures to eliminate this danger are suggested in U.S. Pat. No. 4,676,117. At merely one axial face side of the outer gear rim and the pinion, there is a single pair of stop collars which travel on each other. Special means assure that these stop collars are held in contact with each other during roller operation. The stop collars are so dimensioned, that is, they are of such radial dimensions, that tilting of the pinion out of its normal position parallel to the outer gear rim is impossible during roller operation. That means which maintains the contact between the stop collars must produce a tilting moment on the pinion. Two possibilities for this are disclosed in U.S. Pat. No. 4,676,117. In one of them, this tilting moment is produced via a spiral toothing of the gear wheels. This has the disadvantage that only one direction of roller rotation can be used. In the second possibility for producing a tilting movement, the tooth coupling shaft is arranged obliquely to the pinion axis. This has the disadvantage that upon reversal of the direction of roller rotation, the direction of the oblique arrangement of the tooth coupling shaft must be changed.

SUMMARY OF THE INVENTION

The object of the present invention is to provide spur gearing of the type in question in which, as previously, the force-transmitting flanks of the gear wheels of the outer gear rim and the pinion always contact each other substantially over their entire axial lengths, and this contact is assured independently of the direction of rotation of the gearing. As a result, the direction of rotation should be reversible without any change in the gearing.

This object is achieved by the spur gearing for driving a roller of the invention.

The outer gear rim of the gearing is rigidly connected to the end of the roller and is supported on an appropriate support. A first self-aligning bearing is disposed radially inward of the outer gear rim. The support is radially inward of that first bearing. A rotatable hollow pinion has an exterior in mesh engagement with the exterior of the outer gear rim so that the pinion drives the outer gear rim and the roller to rotate. A second self-aligning bearing is disposed inside the hollow body of the pinion. Means radially inward of the second bearing join the second bearing to the support. There is a pinion tilt angle limiting device having a radial clearance which permits only limited incline of the pinion to a desired angle, an incline angle of less than 1°, and preferably less than 0.6°. The pinion tilt angle limiting device is preferably located to at least one axial side of the pinion or it may be at both axial sides of the pinion, as called for in different embodiments. Generally, during normal operation of the gearing, the limiting device is in engagement with the pinion and thereby limits the incline of the pinion a the pinion rotates and drives the outer gear rim. The limiting device engages the pinion only after the pinion has tilted to the predetermined angle.

It has surprisingly been found that the mutual contact of the gear flanks over the entire tooth width can still be assured even if the axis of the pinion is not precisely parallel to the axis of the outer gear rim but is instead inclined by a small angle of tilt. It is merely necessary that this angle of tilt be maintained sufficiently small. According to the invention, a tilt-angle limiting device limits the angle of tilt of the pinion to values of less than 1°· and preferably less than 0.6°. The possible angle of tilt of the pinion must not be reduced to zero. Instead, that permissible angle must be larger than the largest angle of inclination of the outer gear rim, relative to the gear housing support bracket and therefore upon a sagging of the roller shell during operation of the roller under load. It has been found that this greatest angle of inclination of the outer gear rim, which occurs upon the sagging of the roller shell, is on the order of magnitude of 0.1° for the ordinary roller dimensions.

In all embodiments of the invention, the pinion is supported, as previously, on a rigid, non-inclinable, journal pin by means of a single second self-aligning bearing whose center point is at least approximately in the center of the pinion.

In one embodiment, the device which limits the angle of tilt is preferably formed by an additional self-aligning bearing. That limits the angle of inclination of the pinion relative to the non-inclinable gear housing, preferably to a value of less than 0.6°.

For instance, upon roller standstill, when the roller is lifted from the mating roller, or upon installation work, the roller axis and thus the outer gear rim can incline relative to the housing up to 1.5°. In standstill condition, this value is not critical since, in addition to the limited tiltability of the pinion relative to the housing, the customary backlash (flank clearance) between the pinion and the outer gear rim permits, at standstill, inclination of the axis of the outer gear rim relative to the axis of the pinion. If necessary, this backlash, which in any event is always present, is made slightly greater than customary. Furthermore, if necessary, the dedendum of the teeth of both gears can be made somewhat larger. All of these measures make it possible, without difficulty, to permit at standstill a tilting of the outer gear rim with resect to the pinion, on the order of magnitude of 1°. In addition, as already mentioned, there is the inclinability of the pinion relative to the housing by, for instance, 0.5°. Thus, as a whole, at standstill a tilt of the outer gear rim relative to the housing of a total of 1.5° is definitely possible.

According to FIG. 1 of U.S. Pat. No. 4,676,117, a device for limiting the angle of tilt of the pinion is provided axially alongside the central self-aligning bearing of the pinion. This device can be developed as a support ring or as an antifriction bearing. This known limitation of the angle o tilt can, however, only be active when the gearing is stationary or idling, i.e. it is without substantial transmission of torque. This tilt angle limitation prevents the edges of the teeth from striking against the tooth bottoms of the mating gear if tilting takes place during which the stop collars move away from each other. During operation under load, this known limitation of the angle of tilt remains inactive because the parallel relationship of the axes of the two gears is assured by the above noted single pair of stop collars. The present invention permits the stop collars to be dispensed with. Means for limiting the angle of tilt in accordance with the invention comprises a third self-aligning bearing arranged on the pinion or comprises entirely differently developed stop collars, as explained further below.

The addttional self-aligning bearing which serves for the limiting of the angle of tilt can be arranged in various ways. That additional or third self-aligning bearing is at one axial side of the second self-aligning bearing. An extension from the bearing journal for the second bearing extends through and is radially inward of the third bearing. That third bearing is axially and radially inside the pinion. The extension, the third bearing and the interior of the pinion around the third bearing are respectively so shaped and dimensioned that there is a radial clearance gap between the extension, on the one hand, and the interior of the pinion, on the other hand. This enables the pinion to tilt with respect to the extension until the radial gap is closed. Thereafter, the extension operates through the third bearing upon the interior of the pinion to limit further tilting of the pinion.

In a preferred embodiment, the third bearing includes an outer ring attached to the pinion. The third bearing also has an inner ring, which is radially outside and around the extension from the journal of the second bearing. The extension from that journal and the third bearing are respectively so shaped that a radial gap is defined between the exterior of the extension and the interior of the inner ring of the third bearing, and that is the gap providing freedom for the pinion to tilt before the engagement between the journal extension and the interior of the pinion.

Preferably, the outer ring of the additional self-aligning bearing is firmly attached to the pinion. Radial play is provided between the inside diameter of the inner ring and the outside diameter of an extension of the journal pin. However, a reversed arrangement is also conceivable, namely connecting the inner ring firmly to the journal pin and providing the radial play between the outside diameter of the outer ring and an inside diameter of the pinion.

There may additionally be a guide bushing inserted inside the inner ring of the third self-aligning bearing. The guide bushing has an interior. The gap between the exterior of the extension from the second journal and the interior of the guide bushing within the inner ring of the third bearing is the gap permitting the tilting of the pinion.

Another means for limiting the angle of tilt limits the inclination of the axis of the pinion relative to the axis of the outer gear rim. In this embodiment, the tilt angle limiting device comprises a first collar disk at one axial side of the outer gear rim and another first collar disk at the same axial side of the pinion. These first collar disks are axially so placed that they ca be moved radially into engagement with each other upon inclining of the pinion. There is a second collar disk at the opposite axial side of the outer gear rim and another second collar disk at the same opposite axial side of the pinion. The second collar disks are so placed axially that they can be moved radially into engagement as the pinion inclines. The collar disks are of a size that they are normally out of contact with each other, but the respective pair of collar disks at one side come into contact with each other upon inclining of the pinion in a direction to close the respective gap. The collar disks engage when the tilt angle of the pinion exceeds a predetermined value. The tilt limitation is again effected to a value which is less than 1°, and preferably less than 0.6°. This has the same result as when using the additional self-aligning bearing described above.

Other objects, features and embodiments of the invention are described below with reference to the drawings, which show two examples.

BRIEF DESCRIPTION OF THE DRAWINGS

FIG. 3 is a partial longitudinal section through another embodiment of the spur gearing.

DESCRIPTION OF THE PREFERRED EMBODIMENTS

Figure 1:
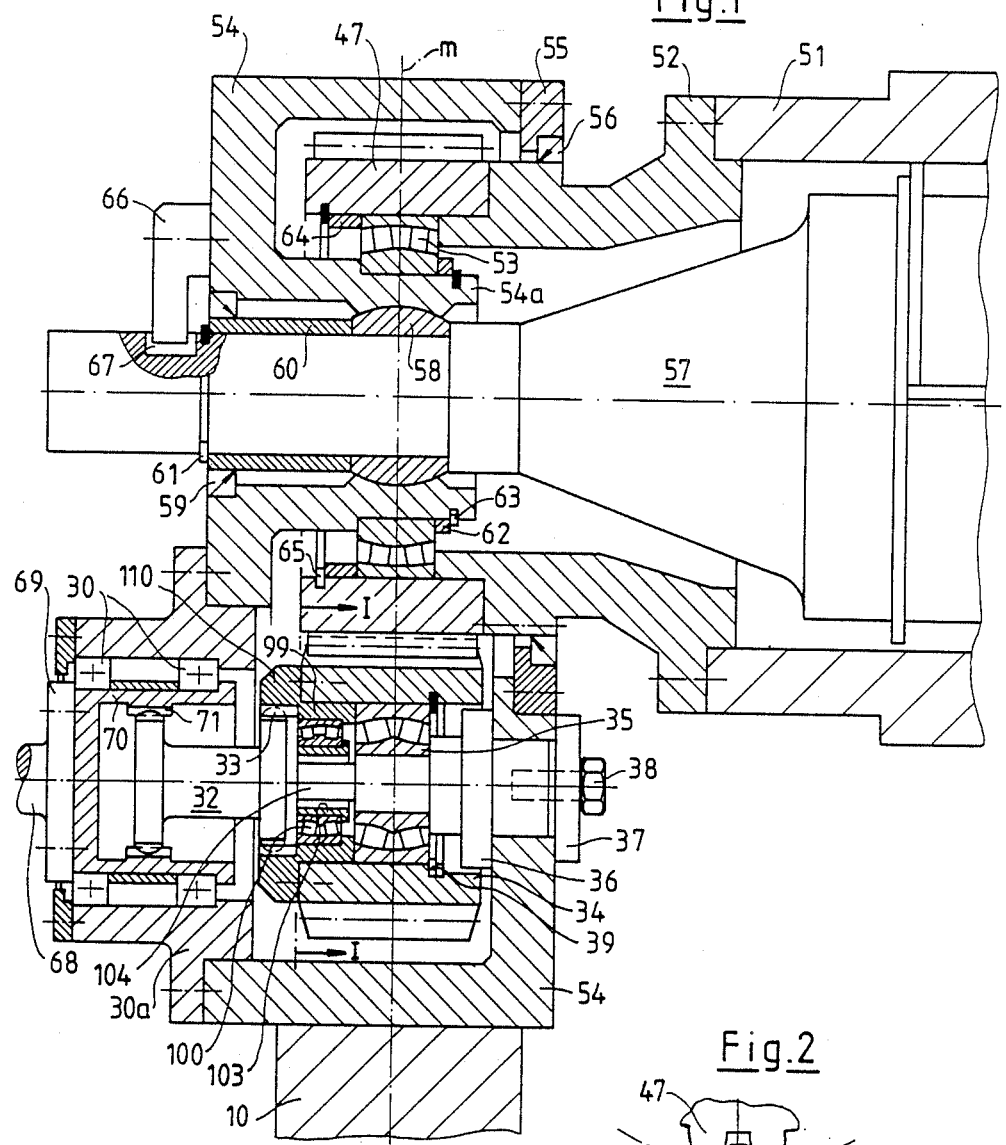
FIG. 1 is a longitudinal section through the spur gearing for the drive of a press roll of a papermaking machine.

The spur gearing of the invention is shown in conjunction with a press roll of a paper making machine. It may be used for other rolls in such a machine. or for any driven roll that periodically deflects sightly along its axis.

A bearing neck 52 is bolted to a driven roller shell 51 of a press roll. An outer gear rim 47 with external teeth is bolted to the bearing neck. These elements are rigid with each other and move together. The roller shell is extended in this manner. The roller shell is mounted by a first self-aligning roller bearing 53 on an extension piece 54a of a support bracket pedestal 54. A stationary flexure beam, girder or yoke 57 is pivotally connected via a spherically curved sleeve 58 to the extension piece 54a. Yoke 57 can bend and pivot at sleeve 58. A lip seal 59 seals off the slot between the supporting pedestal 54 and a sleeve 60 pushed over the yoke 57. A spring washer 61 holds the spherical sleeve 58 axially firm via the sleeve 60. The support bracket 54 is fastened on a pressing lever, pressing piston or frame 10. The bearing 53 is secured by a support ring 62 and a spring washer 63 against axial displacement with respect to the support bracket 54. On the other hand, the outer gear rim 47 is secured against displacement with respect to the bearing 53 by support ring 64 and spring washer 65.

A nose 66 which is fastened on the support bracket 54 extends into a groove 67 in the yoke 57 and secures the yoke against rotating.

A drive pin 68 is fastened by a flange 69 to a gear element in the form of a drive sleeve 70 with internal toothing 71. The drive sleeve 70 is mounted in two anti-friction bearings 30. The bearings rest in a bearing bracket 30a which is bolted onto the support bracket 54. The toothing 71 is drivingly connected to a universal shaft or gear coupling shaft 32, through the external toothing 33 on the shaft. Through the coupling shaft 32, the drive sleeve 70 drives a pinion 34.

Pinion 34 is developed as a hollow body. The external teeth of the pinion mesh with the external gear teeth of the outer gear rim 47. In the center of the pinion 34, there is a spherical second self-aligning bearing 35. That bearing 35 swingably mounts the pinion on a journal pin 36. The inner ring of that bearing is fastened by a collar developed on the pin 36, a disk 37 and a screw 38 to tee support bracket 54. During operation of the press roll, if the roller shell 51 sags or the press roll assumes an oblique position for some other reason, the outer gear rim 47 tilts accordingly, and the bearing 35 permits the meshing pinion 34 to adapt itself to this inclination.

The two toothings 71 and 33 are angularly adjustable tooth couplings. As a result, the tooth coupling shaft 32 can assume an oblique position when the pinion 34 tilts.

The second bearing 35 is held axially in the pinion 34 by a spring washer 39. The support bracket 54 is at the same time the gear housing for the gears 34 and 47. In the region of the bearing neck 52, the inside of the gear housing is sealed off from the outside by cover 55 and lip seal 56.

A mating roll for cooperating with roll shell 51 and the support for the mating roll are not shown in the drawing.

The axial center points of the bearings of the mating roller, the self-aligning bearing 53 and the spherical sleeve 58 of the yoke 57, as well as of the pinion, all lie preferably in the same central plane which is perpendicular to the axes and at approximately the axial center of the outer gear rim and the pinion.

It is important that the axis of the pinion 34 not be able to freely tilt by any angle but only that it be able to tilt by a very small angle. In this way, upon the meshing of the outer gear rim 47 and the pinion 34, optimal transmission of force is assured and retained. For this tilt limiting purpose, the pinion 34 is connected with the outer ring of a third self-aligning bearing 100 which is axially offset from bearing 35 in the direction toward the coupling shaft 32. A guide bushing 103 can be inserted within the inner ring. An extension 104 of the journal pin 36 extends inside the guide bushing 103. The diameter of the extension 104 is smaller than the inside diameter of the guide bushing 103 producing a small annular slot, i.e. radial clearance, between the extension 104 add the guide bushing 103. The invention, however, can be practiced without guide bushing 103. In that case, a small annular slot is provided between the extension 104 and the inner ring of the self-aligning bearing 100. Another possibility is to fix the inner ring of the self-aligning bearing in position to the extension 104 and to provide a small radial clearance annular slot s between the outer ring of the self-aligning bearing and the interior of the pinion 34.

In all of these embodiments, it is essential that the radial clearance between the pinion and the extension be of such amount that the possible angle of tilt of the pinion 34 relative to the support bracket 54 is limited to a value of less than 1°, and preferably to a value of less than 0.6°. Such a small angle of tilt assures that the transmission of force between the tooth flanks of the outer gear rim 47 and the pinion 34 is always sufficient. Force transmission also remains sufficient when the pinion 34 is inclined somewhat within the limits established. Dependent upon the direction of rotation, the pinion tilts a small amount in the one direction or a small amount in the other direction. Both of these are uniformly permissible. Thus, the roller 51 can be driven in both directions of rotation without requiring any mechanical change and/or adaption of the drive parts.

Limitation of the angle of tilt of the pinion 34 is assured via the annular slot between the third self-aligning bearing 100, acting as a tilt-limiting bearing, possibly with the inserted guide bushing 103, and the extension 104 of the bearing journal 36. If the pinion 34 is tilted, then the inner ring of the third self-aligning bearing 100 is tilted until the inner ring, or possibly the guide bushing 103, finally rests along a line on the extension 104 of the bearing journal 36. The inner diameter of the inner ring of bearing 100, or possibly of the guide bushing 103, and the outer diameter of the extension 104 must accordingly be so radially spaced apart and adapted to each other that the angle of tilt of the pinion 34 is limited to less than 1°, and preferably to less than 0.6°.

For transmitting force from the tooth coupling shaft 32 to the pinion 34, there is a flange 110 attached to the axial face side of the pinion 34. The flange 100 is thus an extension of the pinion 34. The flange 110 has inner toothing which meshes with the toothing 33 of the tooth coupling shaft 32. The transmission of force from the tooth coupling shaft 32 to the pinion 34 thus takes place via the toothing 33.

The flange 110 furthermore has an axial extension, a bushing 99, which extends inside the pinion 34 and receives the outer ring of the tilt-limiting third self-aligning bearing 100. The bushing 99 at the same time axially secures the second self-aligning bearing 35 at its outer ring. The outer ring of the tilt-limiting bearing 100 is seated firmly in the bushing 99 of the flange 110 at a distance away from, but alongside, the second self-aligning bearing 35.

Upon rotation of the tooth coupling shaft 32, lubrication of the flanks of the teeth 71 is improved by producing an axial sliding movement of the flanks on each other. As with known spur gearings, this axial sliding movement is produced because the tooth coupling shaft 32 is arranged inclined with respect to the axis of the roller, that is inclined relative to the plane which is determined by the axes of the meshing outer gear rim 47 and pinion 34. The angle of inclination of the tooth coupling shaft 32 is preferably selected so that it is greater than the maximum angle of tilt of the pinion 34. This inclined arrangement of the tooth coupling shaft 32 exerts a tilting moment on the pinion 34 while it is in continuous operation This moment is transmitted by the third self-aligning bearing 100 to the bearing journal 36 fastened to the housing. Therefore, the self-aligning bearing 100 must be dimensioned for a continuously acting, larger radial bearing force than the tilt-angle limiting bearing in U.S. Pat. No. 4,676,117.

Figure 2:
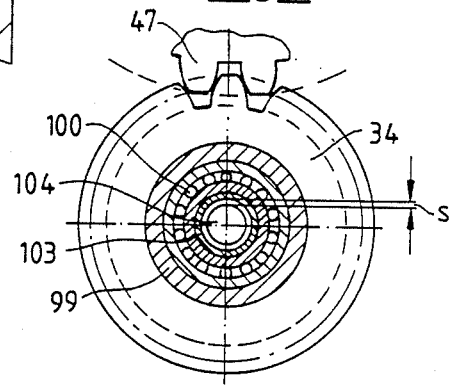
FIG. 2 a partial section along the line I—I of FIG. 1.

In FIG. 2, section I—I through FIG. 1, the essential features are shown. Outer gear rim 47 and pinion 34 are in mesh. The pinion 34 is attached to a coaxial flange 110, FIG. 1, having the extension bushing 99, which is shown in section in FIG. 2. The third self-aligning bearing 100 is inserted into the bushing 99, an the outer ring of the bearing 100 is firmly seated in the bushing 99. The guide bushing 103 is inserted into the inner ring of the self-aligning bearing 100. The annular slot s provided between the guide bushing 103 and the extension 104 (of the bearing journal 36) limits the angle of tilt of the pinion 34.

FIG. 3 shows another embodiment in which, aside from the two gears 34a and 47a, only the parts of the gearing which directly adjoin the two gears are shown. The pinion 34a is again mounted by a second self-aligning bearing 35 on the bearing journal 36a, secured now by means of disk 40 and lock ring 41. At the location of the third self-aligning bearing 100 of FIG. 1, there is instead the toothing 33a of the tooth coupling shaft 32a. As contrasted with FIG. 1, toothing 33a and bearing 35 are axially closer. The support for the outer gear rim 47a is identical to that shown in FIG. 1.

Differing from FIG. 1, both gears 34a and 47a have collar disks 72, 82 and 73, 83, respectively, on both of their face sides. The collar disks 72, 73 and 83 can be screwed on individually, while the collar disk 82 is a part of the roller shell bearing neck 52a.

The arrangement of these collar disks appear, at first glance, similar to FIG. 5 of U.S. Pat. No. 4,676,117, mentioned above. However, there is one major difference. In FIG. 5 of the U.S. patent, the two collar disks 8 and 78 of the pinion 34 are of different diameter with the latter disk smaller. In the same way, the two collar disks 9 and 79 of the outer tooth rim 47 are of different diameter also with the latter disk smaller. The two collar disks 8 and 9 which are of the larger diameter continuously contact each other during operation with transfer of torque as the disks roll on one another. Their diameters added together are such that the axes of the two gears 34 and 47 remain parallel during operation. The continuous contact between the two larger collar disks 8 and 9 is produced, as mentioned above, by a tilting moment which acts on the pinion 34. The smaller collar disks 78 and 79 therefore do not contact each other under normal operation as there is always a definite distance between them. Only upon standstill or idling of the gearing can it happen that the parallelism of the two gear axes is lost. In that case, the two larger collar disks 8 and 9 separate and the smaller collar disks 78 and 79 come into contact.

The embodiment of FIG. 3 herein differs from the prior patent in the following features. The outside diameter of the two collar disks 72 and 73 at opposite axial sides of the pinion 34a are of the same size. Similarly, the outside diameter of the two collar disks 82 and 83 at opposite axial sides of the outside gear rim 47a are of the same size. As long as the axes of the two gears 34a and 47a are parallel to each other, as shown in FIG. 3, there is a small gap s' at both face sides of the gears between the adjacent collar disks, that is, at one side a small gap between the two collar disks 73 and 83 and on the other side a small gap between the collar disks 72 and 82. In the same way as in the embodiment of FIG. 1, upon operation with transmission of torque, the pinion 34a can tilt slightly around its center point, either in the clockwise direction or in the counterclockwise direction, as seen in FIG. 3. The maximum angle of inclination is determined by the diameters of the collar disks and therefore by the inside dimension of the two gaps between disks. These are so dimensioned that the maximum angle of inclination of the pinion 34a, in the same way as in FIG. 1, is less than 1° and preferably less than 0.6° in each direction of tilt. In other words, on each side of the pair of gears 34a, 47a, the sum of the outside diameters of the two collar disks is smaller by the gap width s' than twice the distance between the axis of the pinion and the axis of the outer gear rim.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Spur gearing for driving a roller, the gearing comprising:

an outer gear rim; means rigidly connecting the gear rim to an end of the roller for driving the roller with the gearing; the outer gear rim having a drivable exterior;

a support for the gearing; the outer gear rim being supported on the support and being rotatable with respect to the support; the support also supporting the roller; a first self-aligning bearing disposed radially inward of the outer gear rim, and radially outward of the support;

a rotatable pinion with an exterior in mesh engagement with the exterior of the outer gear rim, whereby as the pinion is rotated, it drives the outer gear rim for rotating the roller; the pinion having a hollow body; a second self-aligning bearing disposed inside the hollow body of the pinion, and the second bearing supporting the pinion radially outward of the second bearing; means radially inward of the second bearing joining the second bearing to the support for supporting the second bearing and for supporting the pinion; the pinion being rotatable around the second bearing with respect to the support;

a pinion tilt angle limiting device having a radial clearance which permits only limited incline of the pinion; the radial clearance being so dimensioned that the pinion incline angle is limited to an angle of less than 1°.

2. The spur gearing of claim 1, wherein the pinion tilt angle limiting device is located to at least one axial side of the pinion.

3. The spur gearing of claim 1, wherein the radial clearance of the limiting device permits incline of the pinion limited to an angle of less than 0.6°.

4. The spur gearing of claim 1, wherein the tilt angle limiting device is so placed that the tilt angle limiting device engages the pinion for limiting the tilting of the pinion after the pinion has inclined to a selected tilt angle of less than 1°.

5. The spur gearing of claim 1, wherein the means forming the second bearing to the support comprises a bearing journal extending from the second bearing to the support;

the tilt angle limiting device comprises a third self-aligning bearing axially to the side of the second bearing and further comprises an extension from the bearing journal for the second bearing, and that extension extends through and is radially inward of the third bearing; the third bearing being axially and radially inside the pinion.

6. The spur gearing of claim 5, wherein the extension, the third bearing and the interior of the pinion around the third bearing are respectively so shaped and dimensioned that there is a radial clearance gap between the extension, on the one hand, and the interior of the pinion, on the other hand, whereby the pinion may tilt with respect to the extension until the radial gap is closed and thereafter the extension operates through the bearing upon the interior of the pinion to further limit the tilting of the pinion.

7. The spur gearing of claim 5, wherein the third bearing includes an outer ring which is attached to the pinion; the third bearing having an inner ring which is radially outside and around the extension, and the extension and the third bearing being so shaped that a radial gap is defined between the exterior of the extension and the interior of the inner ring of the third bearing, whereby the pinion may tilt with respect to the extension without the inner ring of the third bearing contacting the extension until said tilt angle is exceeded, and the third bearing inner ring then contacts the extension and to further limit the tilting of the pinion.

8. The spur gearing of claim 7, further comprising a guide bushing inserted inside the inner ring of the third bearing, the guide bushing having an interior, the gap is between the exterior of the extension and the interior of the guide bushing within the inner ring of the third bearing.

9. The spur gearing of claim 7, wherein at the axial side of the pinion toward the third bearing, the hollow body of the pinion includes internal drive toothing; a coupling shaft including external toothing drivingly engaging in the internal toothing in the pinion, the coupling shaft being driven for driving the pinion to rotate.

10. The spur gearing of claim 9, further comprising means for driving the coupling shaft to rotate for, in turn, rotating the pinion.

11. The spur gearing of claim 10, wherein the coupling shaft is so connected with the internal toothing of the pinion as to enable the pinion to incline with respect to the coupling shaft without separating the driving connection therebetween.

12. The spur gearing of claim 10, wherein the pinion includes a flange at the axial side thereof toward the third bearing, and the inner toothing of the pinion is defined inside the flange; the flange further including a bushing extending axially inside the pinion, and the third bearing being received in the flange bushing for being held to the pinion thereby.

13. The spur gearing of claim 1, wherein the tilt angle limiting device comprises a first collar disk at one axial side of the outer gear rim and another first collar disk at the same one axial side of the pinion; a second collar disk at the opposite axial side of the outer gear rim and another second collar disk at the same opposite axial side of the pinion, the first collar disks of the outer gear rim and the pinion being paired and being axially so placed that they can be moved radially into contact by tilting of the pinion, and the second collar disks being paired so that they can be so moved radially to be moved into contact by tilting of the pinion; the sum of the outside diameters of the first pair of collar disks and also the sum of the outside diameters of the second pair of collar disks both being slightly less than twice the distance between the axis of the pinion add the axis of the outer gear rim, whereby as the axes of the outer gear rim and of the pinion are at least approximately parallel, a clearance is defined between each of the first pair of collar disks and each of the second pair of collar disks; the first and second pairs of collar disks having diameters selected so that the first pair of collar disks are moved into contact when the axis of the pinion pivots relative to the axis of the outer gear rim to incline the pinion at a limited angle of tilt in one direction of less than 1°; and the second pair of collar disks are moved into contact when the axis of the pinion pivots relative to the axis of the outer gear rim to incline the pinion at a limited angle of tilt in the opposite direction of less than 1°.

14. The spur gearing of claim 13, further comprising internal toothing defined in the pinion generally toward one axial side of the pinion; a coupling shaft extending into the pinion, and the coupling shaft having external toothing for meshing with the internal toothing of the pinion for driving the pinion to rotate, the respective internal toothing of the pinion and external toothing of the coupling shaft being shaped for permitting the coupling shaft to incline with respect to the pinion without breaking the driving connection therebetween.

15. The spur gearing of claim 1, wherein the first and second self-aligning bearings have respective centers which are generally in a plane perpendicular to the axis of the outer gear rim.

16. The spur gearing of claim 1, wherein the first bearing is arranged at least approximately centrally axially within the outer gear rim, and the second bearing is arranged at least approximately centrally within the pinion.

17. The spur gearing of claim 16, wherein the first and second self-aligning bearings have respective centers which are generally in a plane perpendicular to the axis of the outer gear rim.

* * * * *